United States Patent
Beedikar et al.

(10) Patent No.: US 12,470,530 B2
(45) Date of Patent: Nov. 11, 2025

(54) SYSTEM AND METHOD FOR SECURING FINANCIAL ENTITY NETWORKS

(71) Applicant: Wells Fargo Bank, N.A., San Francisco, CA (US)

(72) Inventors: Aniket Beedikar, Charlotte, NC (US); Tyler Burns, Charlotte, NC (US); Endya Kershaw, Charlotte, NC (US); Jinwoo Lim, Charlotte, NC (US); Henry Truong, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 250 days.

(21) Appl. No.: 18/463,605

(22) Filed: Sep. 8, 2023

(65) Prior Publication Data

US 2025/0088492 A1    Mar. 13, 2025

(51) Int. Cl.
*H04L 29/06* (2006.01)
*H04L 9/32* (2006.01)
*H04L 9/40* (2022.01)

(52) U.S. Cl.
CPC ........ *H04L 63/0442* (2013.01); *H04L 9/3236* (2013.01); *H04L 63/067* (2013.01); *H04L 63/08* (2013.01); *G06Q 2220/00* (2013.01)

(58) Field of Classification Search
CPC ..... H04L 63/20; H04L 63/0442; H04L 63/08; H04L 9/3236; H04L 63/10; H04L 63/067
See application file for complete search history.

(56) References Cited

U.S. PATENT DOCUMENTS

| | | |
|---|---|---|
| 10,332,108 B2 | 6/2019 | Ciurea |
| 10,621,561 B1 | 4/2020 | Brock et al. |
| 11,727,399 B2 * | 8/2023 | Bansal ............... G06Q 20/3823 705/71 |
| 2013/0018838 A1 | 1/2013 | Parnaby et al. |
| 2018/0349484 A1 * | 12/2018 | Carlisle ............... G06F 16/9535 |
| 2021/0366586 A1 | 11/2021 | Ryan et al. |
| 2022/0122165 A1 | 4/2022 | Miranda et al. |
| 2022/0366494 A1 | 11/2022 | Cella et al. |
| 2022/0384027 A1 | 12/2022 | Kaleal, III et al. |
| 2022/0398340 A1 | 12/2022 | Jakobsson et al. |

* cited by examiner

*Primary Examiner* — Longbit Chai
(74) *Attorney, Agent, or Firm* — SCHWEGMAN LUNDBERG & WOESSNER, P.A.

(57) ABSTRACT

A system includes one or more hardware processors to perform operations for receiving, from a first entity of a financial entity network, a first data request to obtain a private data of a second entity of the financial entity network, and for authenticating the first data request. The operations also include retrieving, from a data repository, an encrypted private data when the first data request is authenticated, and creating, via a dynamic key exchange system, a first single use key. The operations further include providing the first single use key to the first entity, and receiving, from the first entity, a second data request to obtain the private data. The operations also include authenticating the second data request, and providing a second encrypted private data to the first entity when the second data request is authenticated, wherein the second encrypted data is decrypted using the first single use key.

19 Claims, 6 Drawing Sheets

SYSTEM AND METHOD FOR SECURING FINANCIAL ENTITY NETWORKS

TECHNICAL FIELD

The present disclosure generally relates to financial entity networks, and more specifically to securing financial entity networks.

BACKGROUND

Certain entities, individuals, banks, small businesses, suppliers, and the like, participate in one or more networks, such as financial networks. For example, individuals procure financial services from banks and create small business that in turn purchase supplies provided by a variety of suppliers, and that provide goods and services to the public. The various financial network entities exchange data, for example, to conduct business.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document. Various ones of the appended drawings merely illustrate example embodiments of the present inventive subject matter and cannot be considered as limiting its scope.

DETAILED DESCRIPTION

Figure 1:
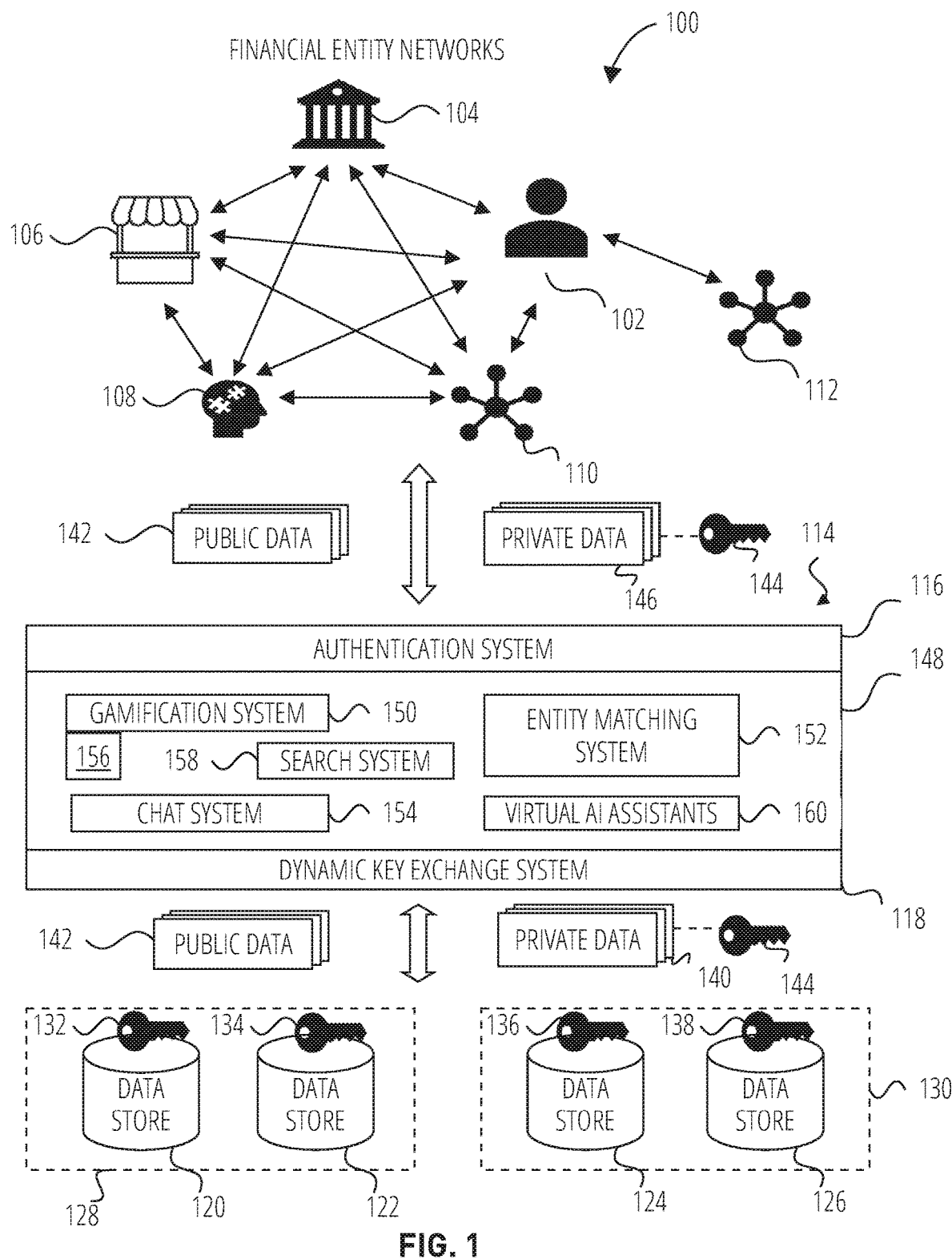
FIG. 1 illustrates an example financial entity network, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The techniques described herein solve various technical problems such as securing certain private or otherwise sensitive data stored for entities in a financial entity network. In certain examples, data partitioning and dynamic keys are used. The dynamic keys are automatically generated based on certain parameters, including a data partition used to store the sensitive data, as further described below. Each request for sensitive data, once authenticated, then receives a new generated key. Accordingly, intercepting communications, including the newly generated key, will result in a more minimal attack vector because the keys are continually being generated and thus are constantly changing.

The techniques described herein also include techniques to more efficiently build and grow the financial entity network, as well as techniques to leverage the financial entity network so that member entities can increase productivity and efficiency. For example, a gamification system provided and used to increase engagement as well as to garner experience points as entities participate in a game-like experience via the financial entity network. The experience points gained can then be monetized, for example, by receiving discounts in certain financial and/or other products, by having an increased exposure to other members of the financial network, by unlocking certain features provided by the financial network (e.g., more advanced investment options) and so on. An entity matching system is additionally provided, that can apply certain artificial intelligence (AI) techniques to match entities that have stated a certain goal. For example, an individual may desire to create a new business, and the entity matching system may then match the individual with other entities of the financial entity network for possible partnership/mentorship opportunities, for procuring loans, for supply chain fulfillment, and so on.

A financial network chat system is additionally provided, suitable for securely connecting the various entities of the financial network. The financial network chat system includes one or more virtual assistants that answer questions related to creating a business, buying a home, investing, saving for college, and so on. The virtual assistant additionally includes a security assistant that monitors communications to prevent, for example, scams and the exposure of confidential information. A search system is further provided, which uses certain artificial intelligence (AI) search techniques to aid an entity in discovering business opportunities, asset purchasing opportunities, investment opportunities, other entities, and so on, to leverage information in the financial entity network. Accordingly, an improved financial entity network can be created, which more securely stores information and provides for business opportunities and growth.

FIG. 1 illustrates an example financial entity network 100, according to some embodiments. In the depicted example, the financial entity network 100 includes a variety of entities, such as individuals 102, financial entities 104, commercial entities 106, service provider entities 108, and entities from other networks (e.g., social networks, financial networks) 110, 112. A network entity and information exchange system 114 is also shown, which enables various financial network techniques as further described below. For example, the network entity and exchange system 148 can provide for more secure data store and dissemination based on partitioned data and dynamic keys exchanges. In certain embodiments, the network entity and information exchange system 114 includes an authentication system 116. The authentication system 116 authenticates the various entities 102, 104, 106, 108, and/or entities included in the networks 110, 112, to access the network entity and information exchange system 114 and then to use various systems of the network entity and information exchange system 114.

A dynamic key exchange system 118 is shown, suitable for automatically creating certain keys (e.g., pretty good privacy (PGP) keys) based new data requests and certain parameters, such as data partitions, session types, login types, login times, and/or user types. The dynamic key exchange system 118 manages key exchanges so that when a request to read, write, and/or update certain data is issued, keys are created that can be used to process the request. The created keys are then shared with a data requestor entity to complete the data request. For example, the requestor entity can receive the data in encrypted form and use the keys to unencrypt the data. If a second request is received for the same data then different keys are created, shared, and used to complete the request. Accordingly, in the event that an attacker procures a key, that key is no longer used to access the data because the key is a single session key.

Data is partitioned into multiple data stores or repositories, which can include virtual data stores. In the depicted embodiment, data stores 120, 122, 124, and 126 are shown. The data stores 120, 122 may be divided into anonymizing data stores 128 and non-anonymizing data stores 130. Anonymizing data stores 128 store data that has been processed to remove personally identifiable information, such as a user's name, driver's license, tax identification number, social security number, and so on. Accordingly, the anonymizing data stores 128 can include data whose individuals they may describe remain anonymous, increasing privacy protection. Each of the data stores 120, 122, 124, and 126 store different data "packages." A non-limiting example of data packages for individual entities 102 include salary, employer, job description, employment history, credit history, education, residential address, business address, age, married status, ethnicity, and so on. A non-limiting example for financial entities 104 include business address, market capitalization, ownership, federal deposit insurance corporation (FDIC) information, number of employees, number of branches, branch locations, financial products offered (e.g., accounts, loans, investments, insurance products), and so on. A non-limiting example for commercial entities 106 includes business address, market capitalization, ownership, number of employees, number of branches if any, branch locations, products offered, and so on. A non-limiting example for service provider entities 108 includes business address, market capitalization, ownership, number of employees, number of branches, branch locations, type of service(s) offered (e.g., accounting, auditing, consulting, and the like). Likewise, entities in the networks 110, 112 can have their information stored as data packages. The data stores 120, 122, 124, and 126 can include relational databases, network databases, No-SQL databases, and so on.

In certain embodiments, each data package has an associated key pair, such as a private and a public key pairs 132, 134, 136, 138 (e.g., PGP private and public keys). The key pairs 132, 134, 136, 138 may be stored by the respective data stores 120, 122, 124, and 126. For private data 140, the private key in a key pair is used to encrypt the data, for example, using PGP encryption. Private data 140 includes data that has been marked for enhanced privacy, such as a person's actual name, salary information, age, social security number, credit history, and so on. During operations, entities 102, 104, 106, 108, and/or entities members of the networks 110, 112, request certain data, such as the private data 140 and/or public data 142. In some embodiments, the dynamic key exchange system 118 is used only for private data 140. In other embodiments, both private data 140 and public data 142 are retrieved via the dynamic key exchange system 118.

When the dynamic key exchange system 118 is used, the dynamic key exchange system 118 creates a new set of keys, such as the depicted keys 144. The keys 144 can include a public key and a private key (e.g., PGP keys). The public key can be used to encrypt the data while the private key can be used to decrypt the data. The encrypted data 146 is then provided to the requesting entity of the financial entity network 100. Public data 142 that is not encrypted can be provided without using the dynamic key exchange system 118.

The network entity and information exchange system 114 additionally includes various systems 148, such as a gamification system 150. The gamification system 150 provides for increased engagement and participation in the financial entity network 100. For example, a game-like environment is provided, which includes gaining experience points based on achieving and/or participating in certain activities such as opening a bank account, creating a new business, attaining certain business metrics (e.g., gross sales, profit amount, investment growth, purchase of certain assets (e.g., a house, a lot, a property share, a car), participating as a mentor, participating as a mentee, and/or taking certain lessons (e.g., business lessons, investment lessons, brokerage lessons, and the like). In some embodiments, goals are selected, such as buying a house, starting a business, reaching an investment goal, and the like, that include certain steps. For example, when buying a house, some steps include selecting a house price range, saving for a house deposit, selecting a real estate engine, and so on. Accordingly, the gamification system 150 includes certain "games" (e.g., purchase a home game, invest for college game, pay off a loan game, and so on) with various steps, and guides the user entity through the steps for reaching the desired goal. Some games can be incorporated inside other games.

For example, the purchase a home game includes a game for saving for a downpayment, and the saving for a downpayment game then can be used to guide and incentivize the user as the user saves for a house downpayment. The games can include unlocking certain "achievements" when a particular task or subtask is accomplished. For example, virtual "trophies" can be presented, showing the accomplished task or subtask. The virtual trophies can then be published to the entities in the financial entity network 100. By incentivizing entities to participate via the gamification system 150, the techniques described herein provide for increased engagement in achieving a desired financial goal.

In some embodiments, the gamification system 150 presents, via a graphical user interface (GUI), a list of various activities to an entity. For example, activities useful in achieving a particular financial goal, such as purchasing a home, can be presented. The gamification system 150 then receives, from the entity, a selection of one or more of the activities presented. The gamification system 150 then tracks completion of the selected one or more of the activities, and assigns experience points to the entity based on the completion of selected one or more of the activities.

Experience points accrued via the gamification system 150 can then be used in various ways. For example, the experience points are published for other entities to see. Entities can then search for other entities that have attained a certain level of experience. For example, an entity purchasing a home can search for a real estate entity that has a minimum number of experience points. Experience points can also be used to unlock certain features. For example, features in the gamification system 150, in an entity matching system 152, in a chat system 154, in a search system 158, and in virtual AI assistants 160. That is, as experience points are garnered, other games and/or more advanced games may then become available. For example, certain investment games such as derivatives trading may become available only after certain experience points have been achieved and/or after the passing of certain investment risk exams. In other non-limiting examples, gamification of the purchase of certain types of real estate such as commercial real estate, real estate purchased for "flipping" purposes, real estate partnerships, and so on, is opened after certain number of experience points are given to a user entity.

The entity matching system 152 provides for matching one or more entities for certain goals, including collaborative goals. For example, user entities may decide to purchase property in common, create a common investment fund, enter into a business together, and so on. Similarly, a user entity that has stated a certain goal, e.g., purchasing a home, may be matched to other entities by the entity matching system 152 for mentorship, real estate advice, to select a real estate agent, to close the purchase, and so on. The entity matching system 152 can apply artificial intelligence techniques, such as deep learning techniques, to match the entities. For example, historical data of groups of entities that work well together can be used to create an AI model (e.g., neural network model) that can then be used to derive matches between certain entities for various goals (e.g., investment goals, business creation goals, asset purchasing goals, and so on).

A chat system 154 is also provided, suitable for communications between entities in the financial entity network 100, and networks 110, 112. The chat system 154 provides for messaging between entities but additionally provides for certain security features. For example, an AI can monitor chats and warn and/or prevent the exchange of certain confidential information. In certain examples, should a user entity type confidential and/or private information, such as social security numbers, account numbers (e.g., bank accounts, investment accounts, mortgage accounts), real names, addresses (e.g., residential addresses, business addresses), and so on. The chat system 154 additionally can detect one or more scams, such as pig butchering scams, catfishing, phishing, and the like. For example, AI models can be trained on chat logs of conversations that occur during various scam types. Accordingly, similar conversation patterns, when observed by the chat system 154, can trigger alerts to the user entity that a scam may be ongoing.

A penalty system 156 is also provided, which is used to derive penalty points based on entity behavior. For example, a first user entity may enter into a contractual agreement to provide goods and services to a second user entity. However, the first entity may be late in delivery, may not have delivered the correct order, may not have delivered the correct quantity, and so on. The penalty system 156 assigns penalty points based on missed contractual obligations, incorrect payments, tardiness of delivery of products/services, and so on. Accordingly, a user entity has both experience points as well as penalty points assigned and made public. Other entities can then have a more accurate representation of the various entities in the financial entity network 100.

A search system 158 is also included, which can search the financial entity network 100 for a variety of information. For example, the search system 158 can search for entities 102, 104, 106, 108, and/or entities members of the networks 110, 112, for games provided by the gamification system 150, for chats in the chat system 154, for mentee opportunities, for mentorship opportunities, for finding business opportunities, asset purchasing opportunities, and so on. In certain embodiments, various filters can be used. For example, when searching for certain entities, filters include setting minimum experience points (e.g., searching for entities having an experience point value at least as high as a desired value), maximum penalty points, number of days/weeks/months/years using the financial entity network 100, goals achieved (e.g., creating a business, buying a home, developing an investment portfolio), and so on, are used to filter search results. The search system 158 can also use AI techniques to search for content related to the financial entity network 100. For example, techniques such as approximate nearest neighbor can navigate through nodes in the financial entity network 100 and return more optimal results based on closeness (e.g., network edge distance) to a given node and/or similarity to a given node. It is to be noted that in some examples the search system 158 is used by the entity matching system 152 to derive matches.

Virtual AI assistants 160 are also provided, which include security assistants, mentoring assistants, search assistants, and/or gamification assistants. Security assistants, as mentioned above, are trained on various attack profiles and logs of scams. For example, security models are trained on logs that have been kept of various attacks and scams, including historical logs as well as training logs, to derive attack profile patterns and scam profiles. Accordingly, similar interactions between entities of the financial entity network 100, when observed by the security assistant, can trigger alerts to the user entity that a scam may be ongoing.

Mentoring assistants can include generative large language models (LLMs) trained on certain licensed data such as business textbooks, classroom videos, blogs, and so on, that teach investing, real estate transactions, brokerage, leveraging, purchasing a home, saving for college, creating various types of business (e.g, small businesses, businesses with certain focuses such as software development, fintech development, online business development, medium-sized business, large businesses), and the like.

Search assistants provide for functionality to search for entities, goods, services, supply chains, investments, assets for sale, and the like. As mentioned earlier, the search assistants can apply techniques such as approximate nearest neighbor can navigate through nodes in the financial entity network 100 and return more optimal results based on closeness (e.g., network edge distance) to a given node and/or similarity to a given node. Gamification assistants provide for help to increase experience points and not accrue penalty points. For example, training data can be gathered from previous gamification activities (e.g., logs kept by the gamification system 150) and used train one or more models. The trained models can then provide for hints, answer questions, and more generally, aid user entities in improving gamification activities. By providing for gamification, chat, AI searching, entity matching, and AI assistants, the techniques described herein result in a more secure and engaging financial entity network 100.

Figure 2:
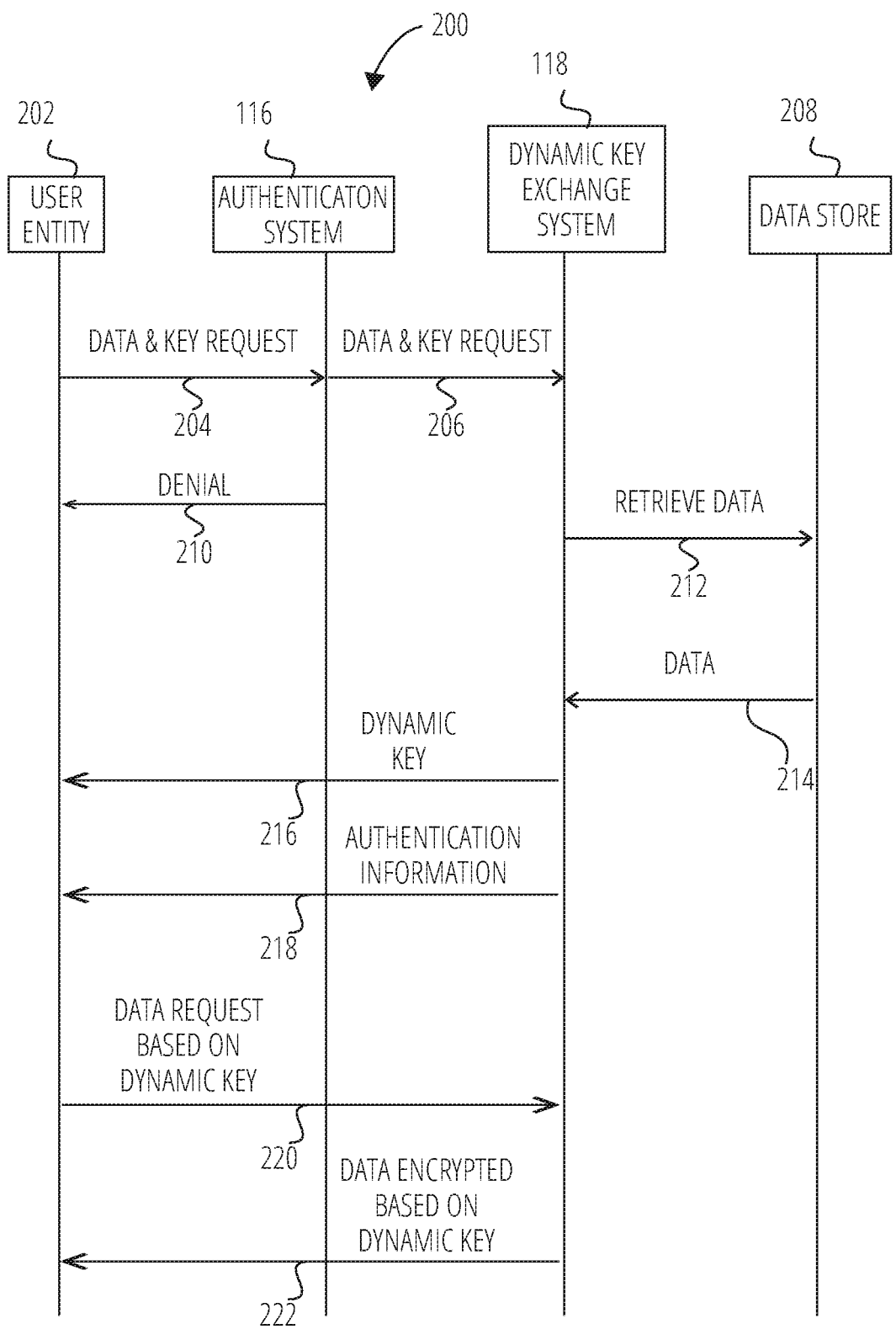
FIG. 2 illustrates an information flow diagram of a use of dynamic keys for enhanced privacy and security, according to some embodiments.

FIG. 2 is an example information flow diagram 200 of the use of dynamic keys for enhanced privacy and security, according to some embodiments. In the depicted example, a user entity 202, such as an entity 102, 104, 106, 108, and/or entities members of the networks 110, 112, can request, via a data and key request 204, certain data, such as data 140, 142. In certain embodiments, the data and key request 204 can be communicated via an application programming interface (API) call, such as a function call, a method call, an event trigger call, and so on. The data and key request 204 includes authentication information that is processed by the authentication system 116, such as a user name, a password, a two-factor authentication, a security token and so on.

Authentication via the authentication system 116 includes determining if the user entity 202 has the proper login credentials and access rights to the data being requested. If the data request 204 fails authentication, a denial of data use 210 is transmitted back to the requesting user entity 202. If the data request 204 is authenticated, the authentication system 116 passes on the data and key request 204 as a data and key request 206 to the dynamic key exchange system 118. It is to be noted that not all information from the data and key request 204 is included in the data request and key 206. In some examples, user login and authentication information is removed.

The dynamic key exchange system 118 then issues a retrieve data request 212 to a data store 208. The data store 208 can be one of the data stores 120, 122, 124, 126. The retrieve data request 212 includes authentication information, such as encrypted keys, passwords, security tokens, and the like, authenticating the dynamic key exchange system 118. The retrieve data request 212, once authenticated as incoming from the dynamic key exchange system 118, then causes the data store 208 to encrypt the requested data (e.g., data 140 and/or 142) using the public key of the dynamic key exchange system 118 and to transmit the encrypted data as data 214.

In the depicted example, the dynamic key exchange system 118 creates a new key pair (e.g., public key and dynamic key pair 144) based on the data 214 received and transmits a private key 216 (e.g., single use key) to the user entity 202. The transmitted private key 216 will now be used to decrypt the desired data (e.g., data 140, 142) encrypted by the corresponding public key. In some embodiments, the private key 216 itself is encrypted using a public key of the user entity 202 and then decrypted via a private key of the user entity 202. In some examples, an authentication information 218 authenticating that the key 216 is being sent by the dynamic key exchange system 118 is also provided. The authentication information 218 can include a login name with a password, and/or a security token.

After authenticating that the key 216 was transmitted by the dynamic key exchange system 118, the user entity 202 issues a data request 220 requesting the data 214 that was decrypted and subsequently encrypted by the public key counterpart to the private key 216. The dynamic key exchange system 118 authenticates the data request 220, and if the data request 220 is authentic, the dynamic key exchange system 118 uses the public key counterpart to the private key 216 and to encrypt the data 214. The encrypted data 222 is then provided to the user entity 202, which can decrypt the data 222 by using the received private key 216. It is to be noted that the key 216 is created on each data and key request 204. Accordingly, if an attacker were to somehow intercept the key 216 or somehow gain access to the key 216, any future data requests will no longer use the same key 216. Indeed, the use of dynamic keys, such as the key 216, can be used to provide for added security in data exchanges of the financial entity network 100.

Figure 3:
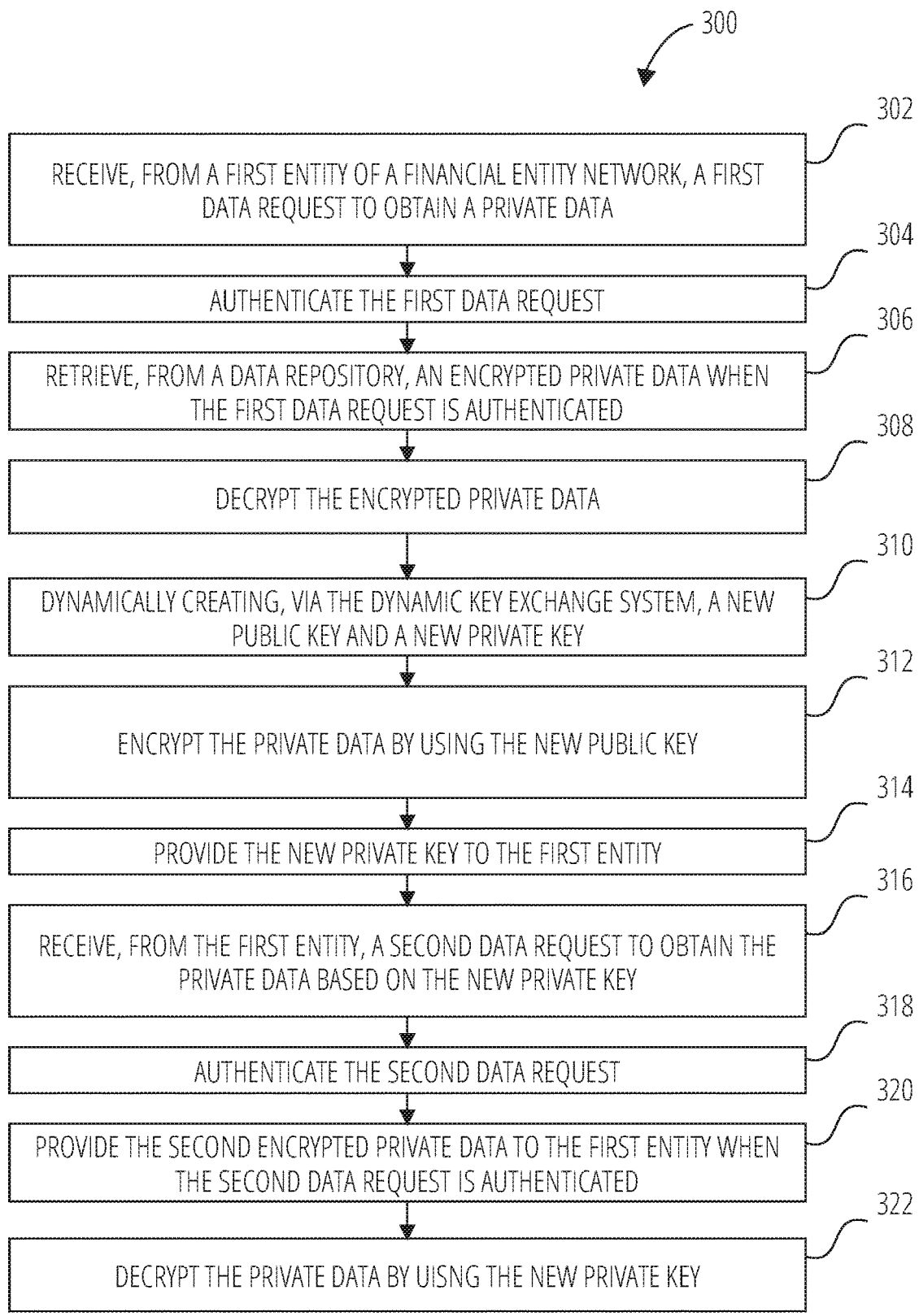
FIG. 3 is a flowchart illustrating an example process suitable for providing dynamic key exchanges for more secure data access, according to some embodiments.

FIG. 3 is a flowchart of a process suitable for providing dynamic key exchanges for more secure data access, according to some embodiments. In block 302, the process 300 receives, from a first entity of a financial entity network, a first data request to obtain a private data of a financial entity network. The first data request can be communicated via an API call, a web service call, or a combination thereof. For example, one of the entities 102, 104, 106, 108, and/or entities included in the networks 110, 112 may request certain private data for an entity of the financial entities 104, such as salary information, real name, employer, job description, employment history, credit history, education, residential address, business address, age, married status, ethnicity, and so on, via a function, a class object, a shared memory, and so on. Accordingly, a data request is issued, such as the data request 204, to the authentication system 116. The authentication system 116, at block 304, authenticates the data request. In some examples, the data request includes an encrypted user name and password, and multifactor authentication (e.g., a security token).

Once the data request is authenticated, the process 300 then retrieves, at block 306, the requested private data from a data repository, such as data stores 120, 122, 124, and/or 126. The data retrieved is encrypted. Accordingly, the process 300, at block 308, decrypts the encrypted data. In some examples, the decryption uses PGP keys, such as the private key of a PGP key pair belonging to the dynamic key exchange system 118. At block 310, the process 300 dynamically creates a new set of keys, such as a new public key and a new private key (e.g., PGP key pair). At block 312, the recently created public key is then used to encrypt the data decrypted in block 308. At block 314, the process 300 provides the recently created private key to the entity requesting the private data. Additionally, the process 300 provides authenticating information that authenticates the private key as being delivered by the dynamic key exchange system 118. For example, a login name and password, and/or security token is used for authentication.

At block 316, the process 300 receives, from the first entity, a second data request to obtain the private data. The second data request can be communicated via an API call, a web service call, or a combination thereof. At block 318, the process 300 authenticates the second data request. In one example, the process 300 authenticates the second data request via the authentication system 116 as mentioned earlier with respect to the first request. In certain examples, the dynamic key exchange system 118 authenticates the request, for example by receiving the private key and/or a hash of the private key sent from the user entity 202 and verifying that the private key and/or the hash of the private key has not yet been used.

After authentication, the process, at block 320, process 300, provides the private data to the first entity (e.g., entity 202) as encrypted data. The dynamic key exchange system 118 will now consider the private key as no longer usable. The data can then be decrypted at block 322 by using the previously transmitted private key. By using dynamic keys, for example, on every request for data (e.g., private data), the techniques described herein provide for a more secure financial entity network 100.

Figure 4:
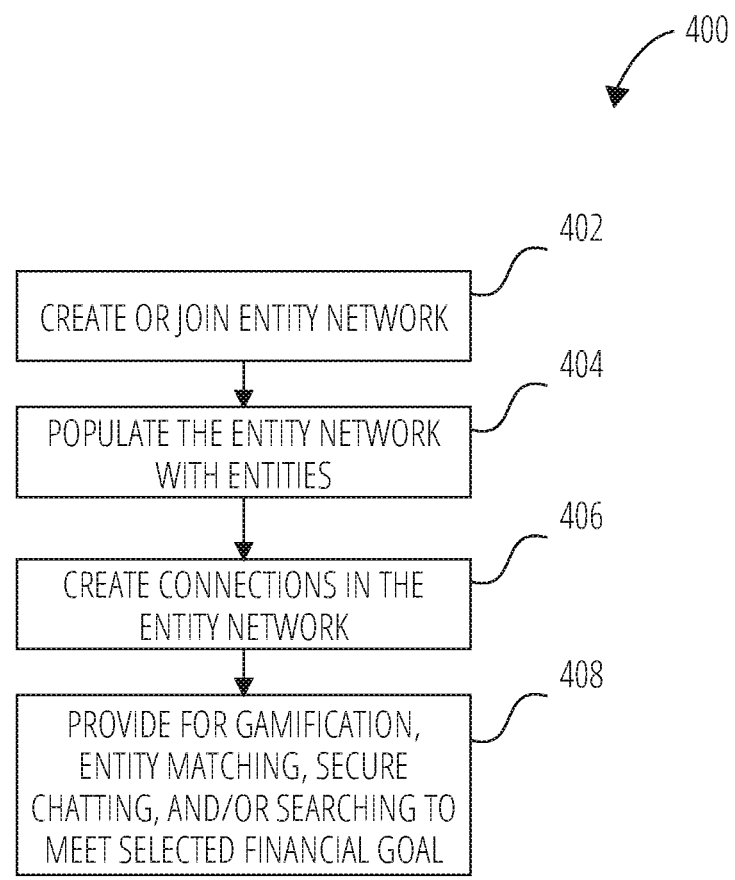
FIG. 4 is a flowchart illustrating a process for creating and using financial entity networks, according to some embodiments.

FIG. 4 is a flowchart of a process 400 for creating and using financial entity networks 100, according to some embodiments. In the depicted example, the process 400 enables a user, at block 402, to create or to join a financial entity network 100. The user can be an owner or an employee of an entity and is authenticated via the authentication system 116 to create and/or to join a financial entity network 100. For example, the user can log into a website or a mobile "app" and use the network entity and exchange system 148 to enter the name of a new financial entity network 100 or to search for an existing financial entity network 100.

The process 400, at block 402, populates the financial entity network 100 with one or more entities. For example, in addition to the "creator" entity that created the financial entity network 100, new entities can be added by invitation. For example, the creator entity can user the search system 158 to find entities to invite. The entities selected will then automatically receive notifications (e.g., via email) to confirm that they would like to join then financial entity network 100. Likewise, entities can search for existing financial entity networks 100 and ask to join.

The process 400 then, at block 406, creates connections (e.g., graph edges of the financial entity network 100) used to connect two or more entities together. In one example, a graph showing all nodes and any current edges between nodes can be presented, were each node is an entity of the financial entity network 100 and each edge is a relationship between two entities (e.g., partner relationship, business provider relationship, service provider relationship, vendor relationship, supplier relationship, mentor relationship, mentee relationship, and so on). The user can then visualize all nodes and edges in a graphical way.

The process 400 enables, at block 408, the achievement of a selected financial goal. For example, gamification can be provided via the gamification system 150 to present certain "games" (e.g., purchase a home game, invest for college game, pay off a loan game, and so on) with various steps, and guides the user entity through the steps for reaching the desired goal. Experience points are accrued, based on achieving and/or participating in certain activities such as opening a bank account, creating a new business, attaining certain business metrics (e.g., gross sales, profit amount, investment growth, purchase of certain assets (e.g., a house, a lot, a property share, a car), participating as a mentor, participating as a mentee, and/or taking certain lessons (e.g., business lessons, investment lessons, brokerage lessons, and the like). Penalty points can also be accrued, based on missed contractual obligations, incorrect payments, tardiness of delivery of a product, tardiness for delivery of a services, and so on.

As the entities 102, 102, 104, 106, 108, and/or entities included in the networks 110, 112 participate in various financial activities, such as those provided by the gamification system 150, entities can be matched, for example, via the entity matching system 152. That is, the entities may better achieve selected financial goals through cooperation with other entities. Accordingly, the entity matching system 152 matches one or more entities to participate in partnerships, in the common purchase of property, in mentee/mentor relationships, in building supply chains, in creating certain types of marketplaces, and so on, previously described. Entities can also use the search system 158 to find other entities, to find new business opportunities, to expand an existing business, and the like.

The chat system 154 is used for communication between the different entities to discuss certain matters securely. As mentioned above, the chat system 154 can be monitor by a virtual security assistant to detect scams, including pig butchering scams, catfishing, phishing, and the like. For example, AI models can be trained on chat logs of conversations that occur during various scam types. Accordingly, similar conversation patterns, when observed by the chat system 154, can trigger alerts to the user entity that a scam may be ongoing. Virtual AI assistants 160 also include mentoring assistants, and/or gamification assistants. Mentoring assistants can include generative large language models (LLMs) trained on certain licensed data such as business textbooks, classroom videos, blogs, and so on, that teach investing, real estate transactions, brokerage, leveraging, purchasing a home, saving for college, creating various types of business (e.g, small businesses, businesses with certain focuses such as software development, fintech development, online business development, medium-sized business, large businesses), and the like. Gamification assistants provide for help to increase experience points and not accrue penalty points. For example, training data can be gathered from previous gamification activities (e.g., logs kept by the gamification system 150) to view the various results of such activities and then used train one or more models.

Figure 5:
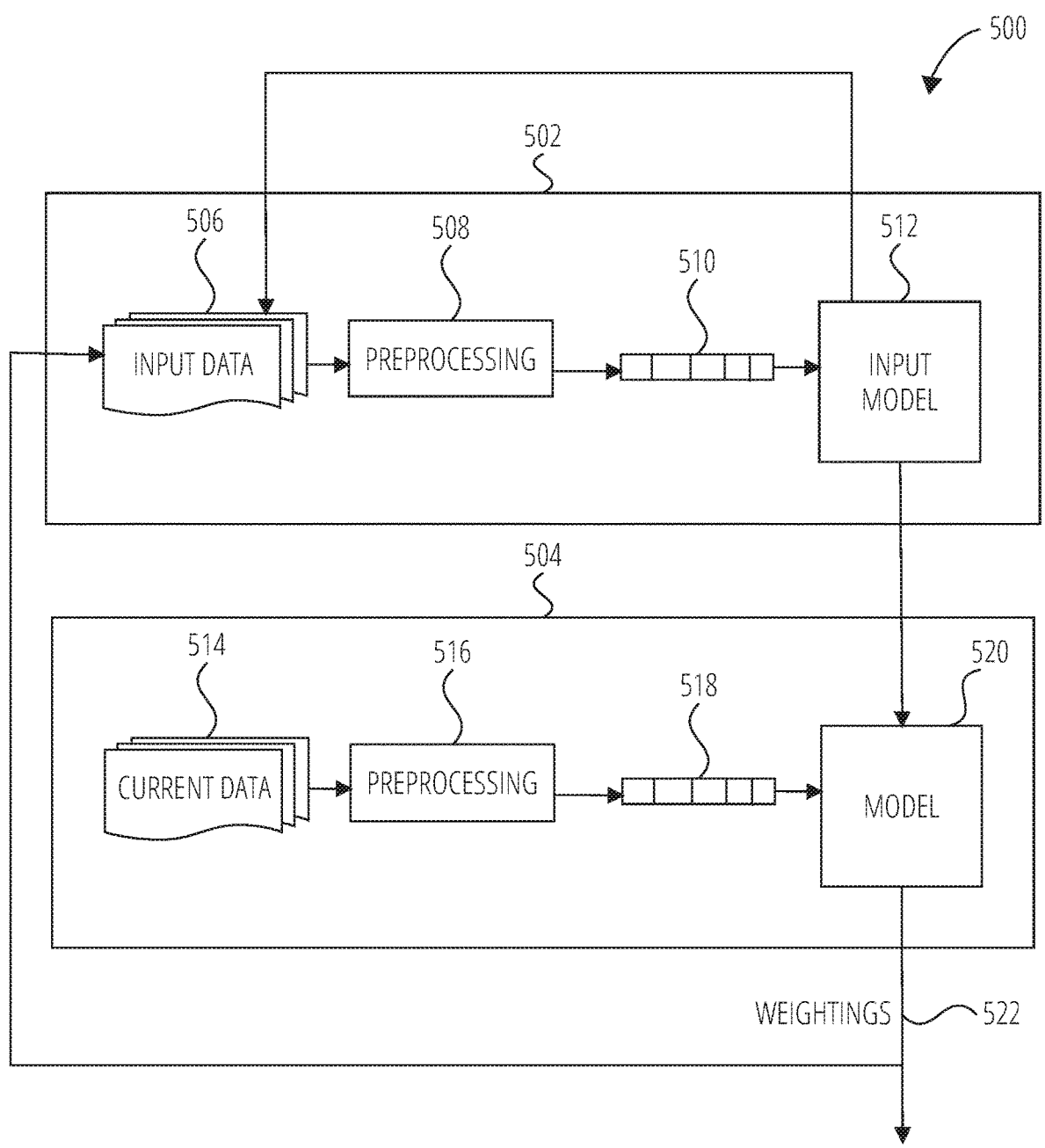
FIG. 5 illustrates a machine learning engine for training one or more AI models, including a gamification model, an entity matching model, a search model, a mentoring model, and a secure chat model, in accordance with some embodiments.

FIG. 5 illustrates a machine learning engine for training one or more AI models, including a gamification model, an entity matching model, a search model, a mentoring model, and a secure chat model, in accordance with some embodiments. The machine learning engine may be deployed to execute at a mobile device (e.g., a cell phone) or a computer. A system may calculate one or more weightings for criteria based upon one or more machine learning algorithms. FIG. 1 shows an example machine learning engine 500 according to some examples of the present disclosure.

Machine learning engine 500 uses a training engine 502 and a prediction engine 504. Training engine 502 uses 506, for example after undergoing preprocessing component 508, to determine one or more features 510. The one or more features 510 may be used to generate an initial model 512, which may be updated iteratively or with future labeled or unlabeled data (e.g., during reinforcement learning).

The input data 506 for gamification model(s) includes logs of gamification activities taken towards a goal (e.g., buying a house, investing to reach a certain amount, saving for a downpayment, saving for college, saving for retirement, starting a business, creating a partnership, and so on) that include results, such as how long it took for the goal to be achieved, steps taken to achieve the results, and so on. Input data 506 for entity matching models include historical data of groups of entities that work well together towards a certain goal. For example, successful partnership data is used that includes properties of the partners, such as personality types of the partners, ages, education, amount of time involved in the partnership, steps taken for collaboration, and so on. Input data 506 for entity matching models also include properties of the various entities that had successful startups, for successful supply chains, successful marketplaces, successful loan payments, and so on, as well as steps taken to achieve various financial goals.

The input data 506 for search models include data for searching for new business opportunities, asset purchases, investment opportunities, loan opportunities, partnership opportunities, franchising opportunities, and the like. Accordingly, entity properties such as type of entity (e.g., individuals, financial entities, commercial entities, service provider entities), age, education, geographic location, risk averseness level, and the like, are related to success in certain types of business opportunities, asset purchases, investment opportunities, loan opportunities, partnership opportunities, franchising opportunities, and the like. For example, a multidimensional vector (Entity property 1, Entity property 2, . . . , Entity property n, Opportunity, Success_Metric) can be created, that tracks for an entity having n entity properties (e.g., a geographic location, an entity age, an entity education, an entity business experience, an entity credit score, an entity savings), a measure of success (e.g., 1 to 10) for a given opportunity (e.g., business opportunities, asset purchases, investment opportunities, loan opportunities, partnership opportunities, franchising opportunities, and the like). Multidimensional vectors of historical data can then be provided as input data 506.

The input data 506 for mentoring models includes data such as books, classroom lessons, videos, blogs, and so on, that teach investing, real estate transactions, brokerage, leveraging, purchasing a home, saving for college, creating various types of business (e.g, small businesses, businesses with certain focuses such as software development, fintech development, online business development, medium-sized business, large businesses), and the like. Input data 506 for secure chat models include logs of chats that have certain attack histories, such as pig butchering scams, catfishing, phishing, and the like. For example, the input data 506 includes chat logs of conversations that occur during various scam types. It is to be noted that all input data 506 is licensed and in compliance with regulatory codes of the appropriate jurisdiction.

In the prediction engine 504, current data 514 (e.g., gamification activity, entity to be matched, ongoing chat activity, search terms) may be input to preprocessing component 516. In some examples, preprocessing component 516 and preprocessing component 508 are the same. The prediction engine 504 produces feature vector 518 from the preprocessed current data, which is input into the model 520 to generate one or more criteria weightings 522. The criteria weightings 522 may be used to output a prediction, as discussed further below.

The training engine 502 may operate in an offline manner to train the model 520 (e.g., on a server). The prediction engine 504 may be designed to operate in an online manner (e.g., in real-time, at a mobile device, on a wearable device, etc.). In some examples, the model 520 may be periodically updated via additional training (e.g., via updated input data 506 or based on labeled or unlabeled data output in the weightings 522) or based on identified future data, such as by using reinforcement learning to personalize a general model (e.g., the initial model 512) to a particular user. Labels for the input data 506 may include gamification activity labels (e.g., purchasing a home, entering into a partnership, saving for a downpayment, and so on), entity labels (e.g., entity type, entity age, entity education, and so on), search terms (e.g., "search of a viable restaurant franchise with an entry cost of between $100,00 and $500,000"), and/or ongoing chat terms (e.g., "I need loan help"), and so on, depending on the type of model 520 used (e.g., gamification models, entity matching models, search models, mentoring models, and/or secure chat models).

The initial model 512 may be updated using further input data 506 until a satisfactory model 520 is generated. The model 520 generation may be stopped according to a specified criteria (e.g., after sufficient input data is used, such as 1,000, 10,000, 500,000 data points, etc.) or when data converges (e.g., similar inputs produce similar outputs).

The specific machine learning algorithm used for the training engine 502 may be selected from among many different potential supervised or unsupervised machine learning algorithms. Examples of supervised learning algorithms include artificial neural networks (e.g., large language models), Bayesian networks, instance-based learning, support vector machines, decision trees (e.g., Iterative Dichotomiser 3, C9.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training engine 502. In an example embodiment, a regression model is used and the model 520 is a vector of coefficients corresponding to a learned importance for each of the features in the vector of features 510, 518. A reinforcement learning model may use Q-Learning, a deep Q network, a Monte Carlo technique including policy evaluation and policy improvement, a State-Action-Reward-State-Action (SARSA), a Deep Deterministic Policy Gradient (DDPG), or the like.

Once trained with the appropriate input data 506, the model 520 then becomes an instance of a gamification model, an instance of an entity matching model, an instance of a search model, an instance of a mentoring model, and/or an instance of a secure chat model. In use the gamification model can present suggestions, such as various steps, to accomplish a selected set of activities. For example, for a goal that includes a home purchase, a set of activities may include saving for a downpayment, selecting a mortgage lender, selecting a real estate agent, selecting a neighborhood, negotiating a sales price, inspecting the property, setting up an escrow account, closing, and so on. The gamification model can take as input properties of the entity that wished to purchase the home (e.g., age, geographic area, education, savings, employment history, credit history, and so on) and provide suggestions. For example, when saving for a downpayment, the gamification model can suggest certain steps, such as diverting a percentage of 401K future deposits into a downpayment fund, cutting certain expenses, reinvesting certain funds, selling an asset, and so on. Accordingly, various steps can be suggested by the gamification model included in the gamification system 150.

The entity matching model is included in the entity matching system 152 and used to provide for entity matching. That is, an entity can be matched to other entities of the financial entity network 100 by searching for entities that in the financial entity network 100 that include certain patterns that have been trained into the entity matching model based on a desired goal (e.g., starting a partnership, buying common property, starting a business, starting an investment club, and so on). Similarly, the search model is used to find business opportunities, asset purchases, investment opportunities, loan opportunities, partnership opportunities, franchising opportunities, and so on, for an entity, based on properties of the entity, such as a geographic location, an entity age, an entity education, an entity business experience, an entity credit score, and/or an entity savings. The mentoring model is used to provide for mentoring based on a selected goal. For example, the mentoring model can include a large language model that has been trained on books, classroom lessons, videos, blogs, and so on, can then explain and mentor an entity on investing, real estate transactions, brokerage, leveraging, purchasing a home, saving for college, creating various types of business (e.g, small businesses, businesses with certain focuses such as software development, fintech development, online business development, medium-sized business, large businesses), and the like. The secure chat model can be used to detect, based on trained patterns, scams such as pig butchering scams, catfishing, phishing, and the like.

Figure 6:
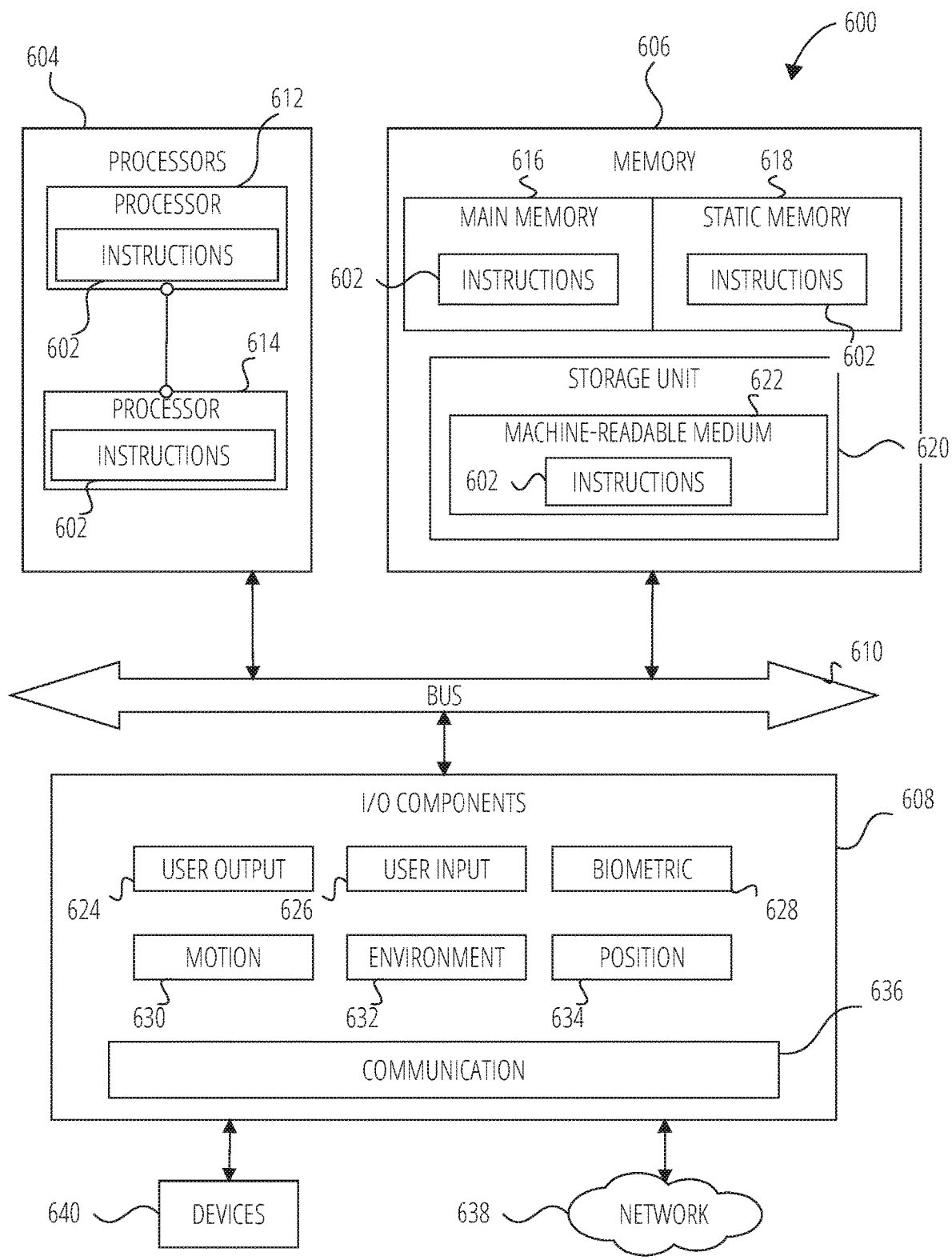
FIG. 6 is a block diagram depicting a machine suitable for executing instructions via one or more processors, in accordance to some embodiments.

FIG. 6 is a diagrammatic representation of a machine 600 within which instructions 602 (e.g., software, a program, an application, an applet, an app, or other executable code) for causing the machine 600 to perform any one or more of the methodologies discussed herein may be executed. For example, the instructions 602 may cause the machine 600 to execute any one or more of the processes or methods described herein, such as the process 300. The instructions 602 transform the general, non-programmed machine 600 into a particular machine 600, e.g., the network entity and exchange system 148, programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 602, sequentially or otherwise, that specify actions to be taken by the machine 600. Further, while a single machine 600 is illustrated, the term "machine" shall also be taken to include a collection of machines that individually or jointly execute the instructions 602 to perform any one or more of the methodologies discussed herein. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 608, which may be configured to communicate with each other via a bus 610. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 612 and a processor 614 that execute the instructions 602. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 616, a static memory 618, and a storage unit 620, both accessible to the processors 604 via the bus 610. The main memory 616, the static memory 618, and storage unit 620 store the instructions 602 embodying any one or more of the methodologies or functions described herein. The instructions 602 may also reside, completely or partially, within the main memory 616, within the static memory 618, within machine-readable medium 622 within the storage unit 620, within at least one of the processors 604 (e.g., within the processor's cache memory), or any suitable combination thereof, during execution thereof by the machine 600.

The I/O components 608 may include a wide variety of components to receive input, provide output, produce output, transmit information, exchange information, capture measurements, and so on. The specific I/O components 608 that are included in a particular machine will depend on the type of machine. For example, portable machines such as mobile phones may include a touch input device or other such input mechanisms, while a headless server machine will likely not include such a touch input device. It will be appreciated that the I/O components 608 may include many other components that are not shown in FIG. 6. In various examples, the I/O components 608 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 608 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 include acceleration sensor components (e.g., accelerometer), gravitation sensor components, rotation sensor components (e.g., gyroscope).

The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 634 include location sensor components (e.g., a global positioning system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 608 further include communication components 636 operable to couple the machine 1200 to a network 638 or devices 640 via respective coupling or connections. For example, the communication components 636 may include a network interface component or another suitable device to interface with the network 638. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 640 may be another machine or any of a wide variety of peripheral devices (e.g., a peripheral device coupled via a universal serial bus (USB) port), internet-of-things (IoT) devices, and the like.

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 616, static memory 618, and memory of the processors 604) and storage unit 620 may store one or more sets of instructions and data structures (e.g., software) embodying or used by any one or more of the methodologies or functions described herein. These instructions (e.g., the instructions 602), when executed by processors 604, cause various operations to implement the disclosed examples.

The instructions 602 may be transmitted or received over the network 638, using a transmission medium, via a network interface device (e.g., a network interface component included in the communication components 636) and using any one of several well-known transfer protocols (e.g., hypertext transfer protocol (HTTP)). Similarly, the instructions 602 may be transmitted or received using a transmission medium via a coupling (e.g., a peer-to-peer coupling) to the devices 640.

The techniques described herein provide for data communication between applications that includes using a digital distributed ledger to annotate certain data communication events and/or to record certain data transfers. By using the digital distributed ledger as further described below, the techniques described herein enable various types of applications, including disparate applications (e.g., applications that are not explicitly designed to work with each other) to transfer information between each other while a record of data transfers is maintained in an immutable and distributed manner. A data transfer chain is recorded by using data transmission records and data receipt records stored in the digital distributed ledger. The recorded data transfer chain provides an immutable and verifiable record of data transactions that have occurred for applications that participated in the chain.

What is claimed is:

1. A system for securing financial entity networks comprising:
   one or more hardware processors; and
   at least one memory storing instructions that cause the one or more hardware processors to perform operations comprising:
   receiving, from a first entity of a financial entity network, a first data request to obtain a private data of a second entity of the financial entity network;
   authenticating the first data request;
   retrieving, from a data repository, an encrypted private data when the first data request is successfully authenticated;
   creating, via a dynamic key exchange system, a first single use key;
   providing the first single use key to the first entity of the financial entity network;
   receiving, from the first entity of the financial entity network, a different second data request to obtain the private data that was requested by the first data request;
   authenticating the second data request sent from the first entity of the financial entity network based on security information associated with the first single use key; and
   providing a second encrypted private data to the first entity of the financial entity network when the second data request is successfully authenticated, wherein the second encrypted data is decrypted using the first single use key such that the first single use key cannot be intercepted and re-used by an attacker in future data requests.

2. The system of claim 1, wherein the encrypted private data has been encrypted via a public key of the dynamic key exchange system.

3. The system of claim 1, wherein the operations for dynamically creating, via the dynamic key exchange system, the first single use key comprise operations for creating a first private key, and wherein the second encrypted data is decrypted via the first private key.

4. The system of claim 3, wherein the operations further comprise dynamically creating, via the dynamic key exchange system a second public key, and wherein the second encrypted data is encrypted via the second public key.

5. The system of claim 1, wherein the operations further comprise:
   receiving, from a third entity of the financial entity network, a third data request to obtain the private data of the second entity of the financial entity network;
   authenticating the third data request;
   retrieving, from the data repository, the encrypted private data when the third data request is authenticated;
   dynamically creating, via the dynamic key exchange system, a second single use key;
   providing the second single use key to the third entity;
   receiving, from the second entity, a fourth data request to obtain the private data;
   authenticating the fourth data request; and
   providing a third encrypted private data to the third entity when the third data request is authenticated, wherein the third encrypted data is decrypted using the second single use key.

6. The system of claim 1, wherein the operations comprise operations for setting a status of the first single key as no longer usable after the second encrypted data is decrypted using the first single use key.

7. The system of claim 1, wherein the operations for receiving, from the first entity, the second data request comprises operations for receiving a hash of the first single use key included in the second data request, and authenticating the second data request based on the hash of the first single use key.

8. The system of claim 1, comprising operations for matching the first entity of the financial entity network with the second entity of the financial entity network based on a common goal.

9. The system of claim 8, wherein the operations for matching the first entity of the financial entity network to the second entity of the financial entity network comprises operations for using a matching artificial intelligence model based on the common goal.

10. The system of claim 1, comprising operations for gamification, via a gamification system, of a plurality of activities of the first entity to achieve a selected goal.

11. The system of claim 10, wherein the operations for gamification comprise operations for:
presenting, via a graphical user interface (GUI), a list of the plurality of activities to the first entity;
receiving, from the first entity, a selection of one or more of the plurality of activities;
tracking completion of the selected one or more of the plurality of activities; and
assigning experience points to the first entity based on the completion of the selected one or more of the plurality of activities.

12. The system of claim 11, comprising operations for presenting suggestions, based on a gamification artificial intelligence model, of one or more steps to complete the selection of the one or more of the plurality of activities.

13. The system of claim 11, comprising operations for publishing, via the financial entity network, the experience points.

14. The system of claim 13, comprising operations for searching, by a third entity of the financial entity network, for entities of the financial network having an experience point value at least as high as the experience points.

15. The system of claim 1, comprising operations for assigning penalty points, via a penalty system, to the first entity based on missed contractual obligations, incorrect payments, tardiness of delivery of a product, tardiness for delivery of a services, or a combination thereof.

16. The system of claim 1, comprising operations for searching, based on an artificial intelligence search model, the financial entity network for business opportunities, asset purchases, investment opportunities, loan opportunities, partnership opportunities, franchising opportunities, or a combination thereof, for the first entity, based on properties of the first entity, wherein properties of the first entity comprise a geographic location, an entity age, an entity education, an entity business experience, an entity credit score, an entity savings, or a combination thereof.

17. The system of claim 16, comprises operations for messaging between the first entity and the second entity based on an artificial intelligence secure chat model configured to detect one or more scams.

18. A non-transitory machine-readable storage medium storing instructions for securing financial entity networks that, when executed by a computer system, cause the computer system to perform operations comprising:
receiving, from a first entity of a financial entity network, a first data request to obtain a private data of a second entity of the financial entity network;
authenticating the first data request;
retrieving, from a data repository, an encrypted private data when the first data request is successfully authenticated;
creating, via a dynamic key exchange system, a first single use key;
providing the first single use key to the first entity of the financial entity network;
receiving, from the first entity of the financial entity network, a different second data request to obtain the private data that was requested by the first data request;
authenticating the second data request sent from the first entity of the financial entity network based on security information associated with the first single use key; and
providing a second encrypted private data to the first entity of the financial entity network when the second data request is successfully authenticated, wherein the second encrypted data is decrypted using the first single use key such that the first single use key cannot be intercepted and re-used by an attacker in future data requests.

19. A method for securing financial entity networks comprising:
receiving, from a first entity of a financial entity network, a first data request to obtain a private data of a second entity of the financial entity network;
authenticating the first data request;
retrieving, from a data repository, an encrypted private data when the first data request is successfully authenticated;
creating, via a dynamic key exchange system, a first single use key;
providing the first single use key to the first entity of the financial entity network;
receiving, from the first entity of the financial entity network, a different second data request to obtain the private data that was requested by the first data request;
authenticating the second data request sent from the first entity of the financial entity network based on security information associated with the first single use key; and
providing a second encrypted private data to the first entity of the financial entity network when the second data request is successfully authenticated, wherein the second encrypted data is decrypted using the first single use key such that the first single use key cannot be intercepted and re-used by an attacker in future data requests.

* * * * *